(12) United States Patent
Perego

(10) Patent No.: US 6,692,015 B2
(45) Date of Patent: Feb. 17, 2004

(54) STROLLER WITH FOLDING FRAME AND RETRACTABLE HANDLEBAR

(75) Inventor: Gianluca Perego, Arcore (IT)

(73) Assignee: Peg Perego S.p.A., Milan (IT)

( * ) Notice: Subject to any disclaimer, the term of this patent is extended or adjusted under 35 U.S.C. 154(b) by 89 days.

(21) Appl. No.: 09/960,565

(22) Filed: Sep. 21, 2001

(65) Prior Publication Data

US 2002/0041082 A1 Apr. 11, 2002

(30) Foreign Application Priority Data

Sep. 22, 2000 (IT) .................................... MI2000535 U

(51) Int. Cl.[7] ................................................ B62B 7/06
(52) U.S. Cl. ..................... 280/647; 280/650; 280/47.38
(58) Field of Search ................... 280/641, 642, 280/647, 650, 657, 658, 42, 47.38, 37, 38, 47.371; 297/21, 46, 50, 60.1

(56) References Cited

U.S. PATENT DOCUMENTS

| | | | | |
|---|---|---|---|---|
| 4,428,598 A | * | 1/1984 | Kassai | 280/644 |
| 4,506,907 A | * | 3/1985 | Miyagi | 280/642 |
| 4,685,688 A | * | 8/1987 | Edwards | 280/30 |
| 4,697,823 A | * | 10/1987 | Kassai | 280/644 |
| 4,817,982 A | * | 4/1989 | Kassai | 280/644 |
| 4,832,361 A | * | 5/1989 | Nakao et al. | 280/642 |
| 4,993,743 A | * | 2/1991 | Takahashi et al. | 280/642 |
| 5,181,735 A | * | 1/1993 | Onishi | 280/642 |
| 5,205,579 A | * | 4/1993 | Kato et al. | 280/642 |
| 5,388,852 A | * | 2/1995 | Bigo et al. | 280/642 |
| 5,417,450 A | * | 5/1995 | Wang | 280/642 |
| 5,810,382 A | * | 9/1998 | Onishi | 280/658 |
| 5,823,564 A | * | 10/1998 | Kettler | 280/642 |
| 5,893,577 A | * | 4/1999 | Takahashi | 280/642 |
| 5,979,928 A | * | 11/1999 | Kuo | 280/642 |
| 6,155,740 A | * | 12/2000 | Hartenstine | 403/102 |
| 6,189,914 B1 | * | 2/2001 | Worth et al. | 280/642 |
| 6,273,451 B1 | * | 8/2001 | Julien et al. | 280/642 |
| 6,276,709 B1 | * | 8/2001 | Chen et al. | 280/650 |
| 6,322,098 B1 | * | 11/2001 | Lan | 280/642 |
| 6,375,213 B1 | * | 4/2002 | Suzuki | 280/649 |
| 6,409,205 B1 | * | 6/2002 | Bapst et al. | 280/642 |
| 6,485,216 B1 | * | 11/2002 | Cheng | 403/102 |

* cited by examiner

*Primary Examiner*—Brian L. Johnson
*Assistant Examiner*—Bridget Avery
(74) *Attorney, Agent, or Firm*—McGlew and Tuttle, P.C.

(57) ABSTRACT

The frame is collapsible longitudinally to the extension of the stroller to change from an open position to a folded position and the handlebar has arms (19) engaging in a sliding manner in corresponding seats (20) in the frame to enable traversing downward thereof upon folding of the frame towards the folded position so as to move from a use position to a retracted position. Locking devices (21) operate upon reaching the folded position to hold this position permanently. The locking devices are kinematically connected to the handlebar to be released upon traversing movement of the handlebar towards its use position.

20 Claims, 5 Drawing Sheets

STROLLER WITH FOLDING FRAME AND RETRACTABLE HANDLEBAR

BACKGROUND OF THE INVENTION

The present invention relates to a foldable stroller with innovative characteristics reducing overall dimensions and easy, and convenient and safe operation of the folding and unfolding mechanisms.

The general purpose of the present invention is to make available a folding stroller having very small overall dimensions after folding while keeping a strong structure and equipped with position locking mechanisms which are safe and at the same time easy to operate.

SUMMARY OF THE INVENTION

In view of this purpose it was sought to provide in accordance with the present invention a stroller comprising a folding tubular frame bearing a baby's seat and comprising in turn pairs of front legs and pairs of rear legs bearing at the bottom wheel units, side armrests and a rear pushing handlebar in the form of an overturned U with the frame being collapsible longitudinally to the extension of the stroller to change from an open position to a folded position characterized in that the handlebar has the arms of the U engaging in a sliding manner in corresponding seats in the frame to enable traversing downward thereof upon folding of the frame towards the folded position so as to move from a use position to a retracted position with locking means operating upon reaching the folded position to hold this position steadily and with said locking means being kinematically connected to the handlebar to be released upon traversing movement of the handlebar towards its use position.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
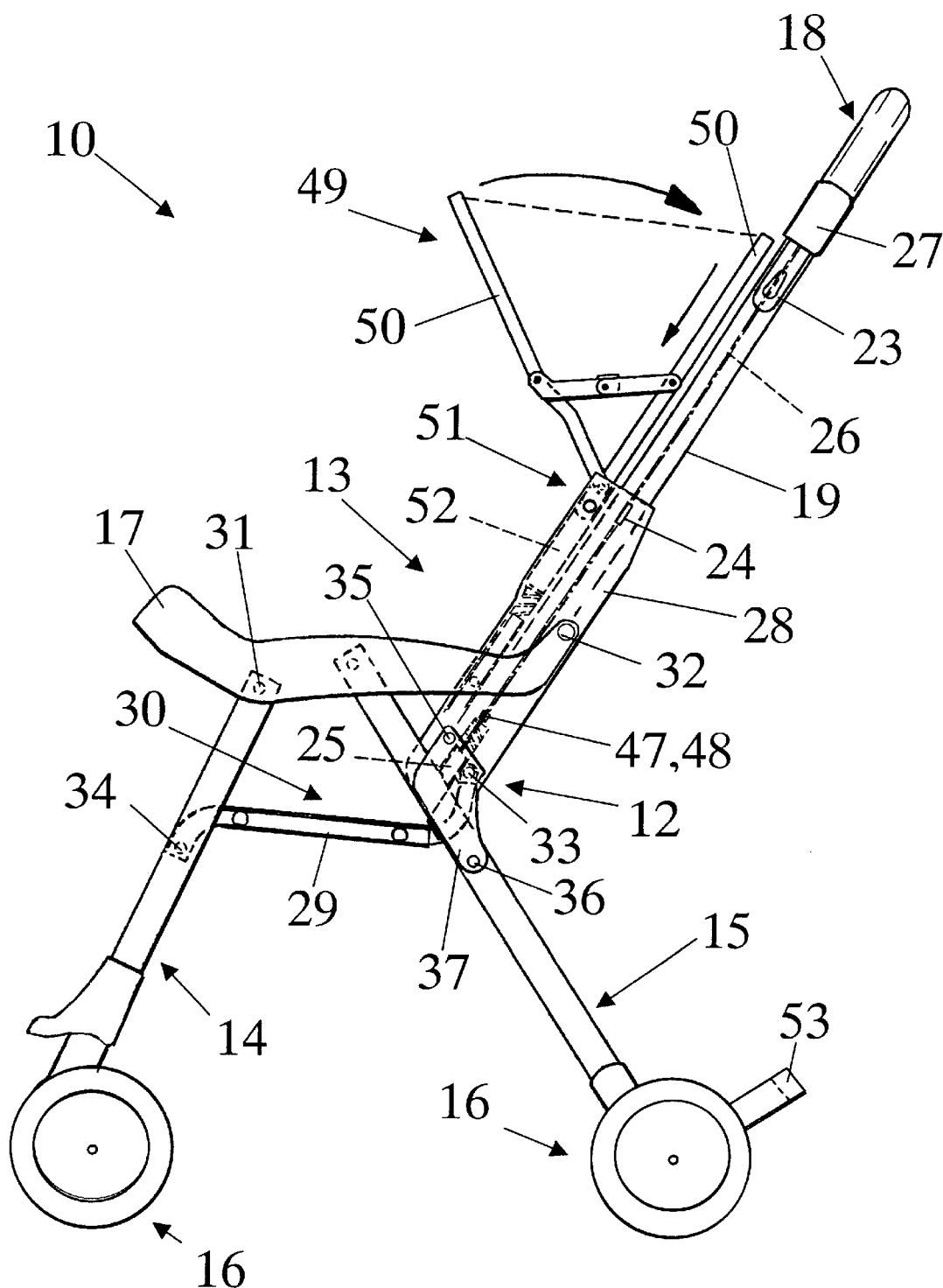
FIG. 1 shows a side elevation view of the stroller in accordance with the present invention in open position.

With reference to the figures, FIG. 1 shows a stroller designated as a whole by reference number 10 comprising a folding tubular frame 12 supporting a seat 13 and comprising in turn pairs of front legs 14 and pairs of rear legs 15 bearing wheel units 16 at the bottom. The frame also comprises side armrests 17 and a rear pushing handlebar 18 in the form of the letter U overturned.

Figure 2:
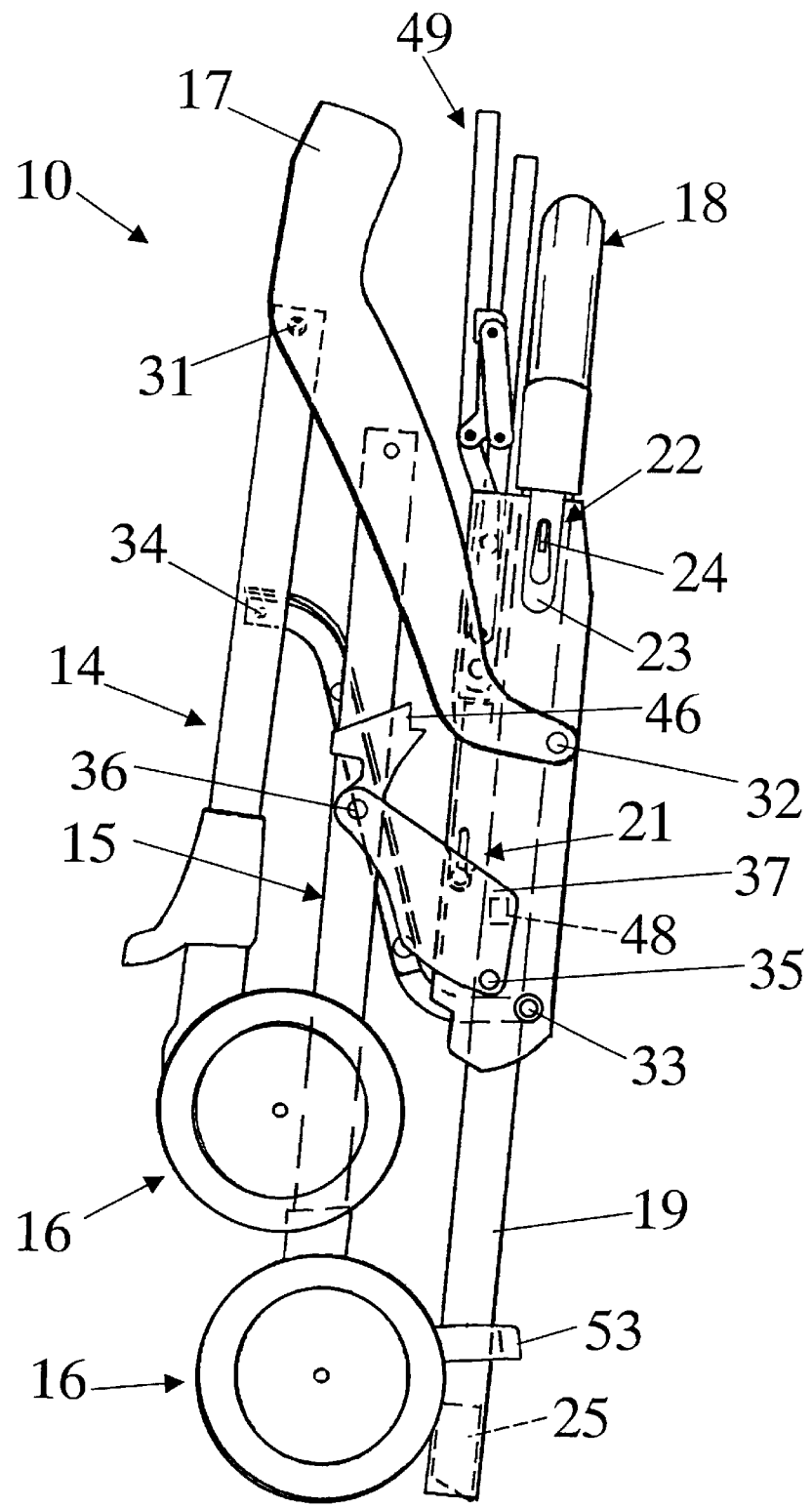
FIG. 2 shows a side elevation view of the stroller in accordance with the present invention in closed position.

The frame is collapsible longitudinally to the extension of the stroller to change from an open position as shown in FIG. 1 to a folded position as shown in FIG. 2.

The handlebar 18 has U arms 19 engaging in a sliding manner in corresponding seats 20 in the frame to enable traversing thereof downward upon folding of the frame towards the folded position so as to move from a use position as shown in FIG. 1 to a retracted position as shown in FIG. 2.

Locking means 21 operate upon reaching the folded position to hold this position steadily. These locking means are connected kinematically to the handlebar 18 to be automatically released upon traversing movement of the handlebar towards its use position.

Advantageously there are also automatic locking means 22 for locking the handlebar in its retracted position. These means are manually releasable and advantageously made with elastic tabs 23 arranged at the sides of the handlebar to engage in teeth 24 projecting from the frame.

The stroller also comprises additional automatic locking means 25 for the open position. Advantageously these additional locking means are connected kinematically by tie rods 26 in the handlebar to pushbuttons 27 located on the handlebar for manual release.

As may be seen in the figures, the frame advantageously defines on each side of the stroller a first jointed quadrilateral formed at the front by a front leg 14, at the top by an armrest 17, at the rear by an elongated member 28 parallel to an arm of the handlebar and having therein the seat 20 for sliding of the arm and at the bottom by a crosspiece 29 supporting the stroller seat 30. The hinging points of this quadrilateral are designated by reference numbers 31, 32, 33, 34 respectively.

As may also be seen in FIG. 2, between each elongated member 28 and the rear leg 15 of the same side an arm 37 is hinged at 35, 36 to form one side of a second jointed quadrilateral whose other sides are formed by a rear leg 15, an armrest 17 and the elongated member 28.

As may also be seen in FIG. 2, in the folded position of the stroller the front and rear legs and the handlebar arms are virtually parallel to each other. Advantageously the rear legs comprise near the wheel units rearward projecting rings 53 in which the handlebar arm ends are fitted when the stroller is in folded position.

Figure 3:
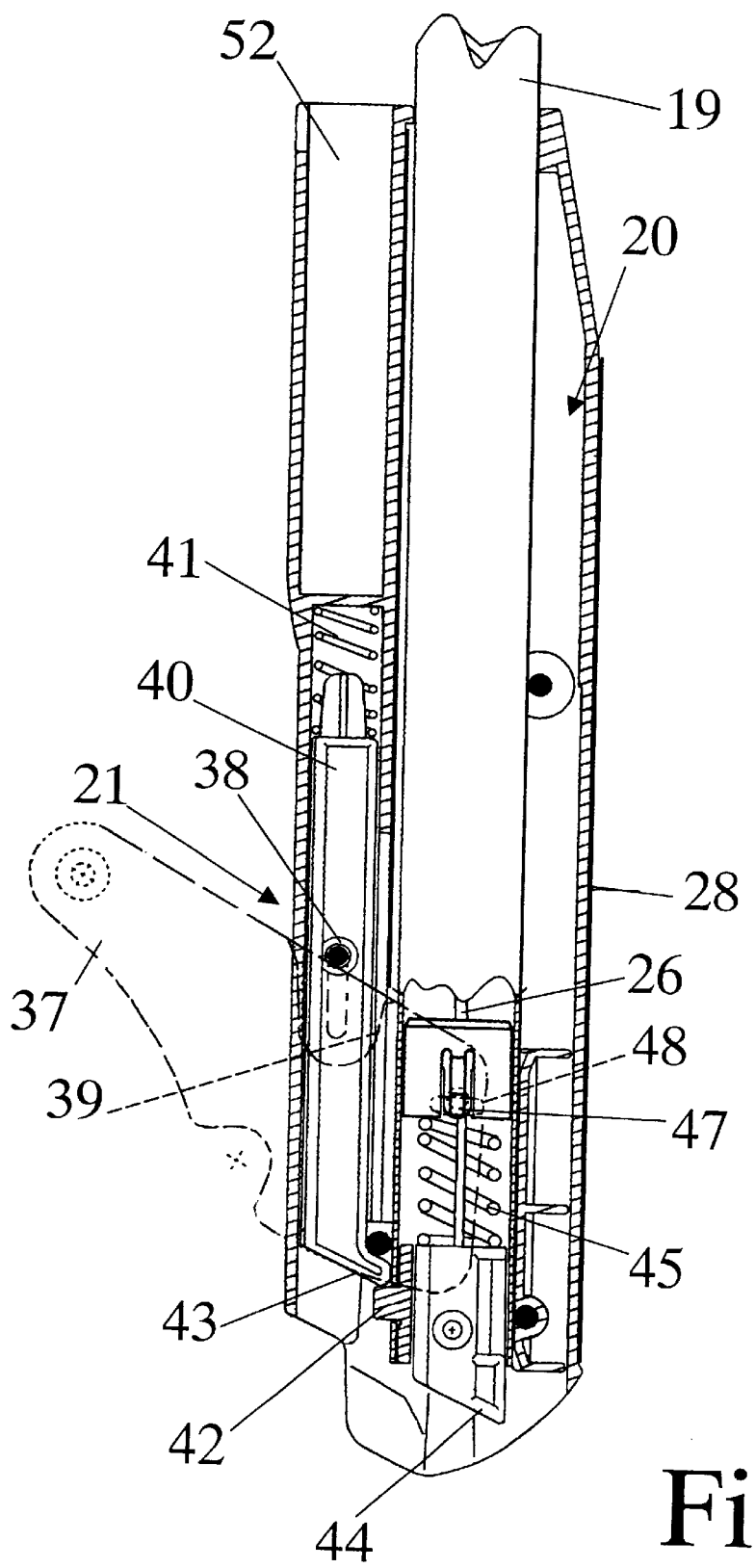
FIG. 3 shows an enlarged cross section view of a locking and unlocking mechanism of the kinematic mechanisms of the stroller of FIG. 1.
Figure 4:
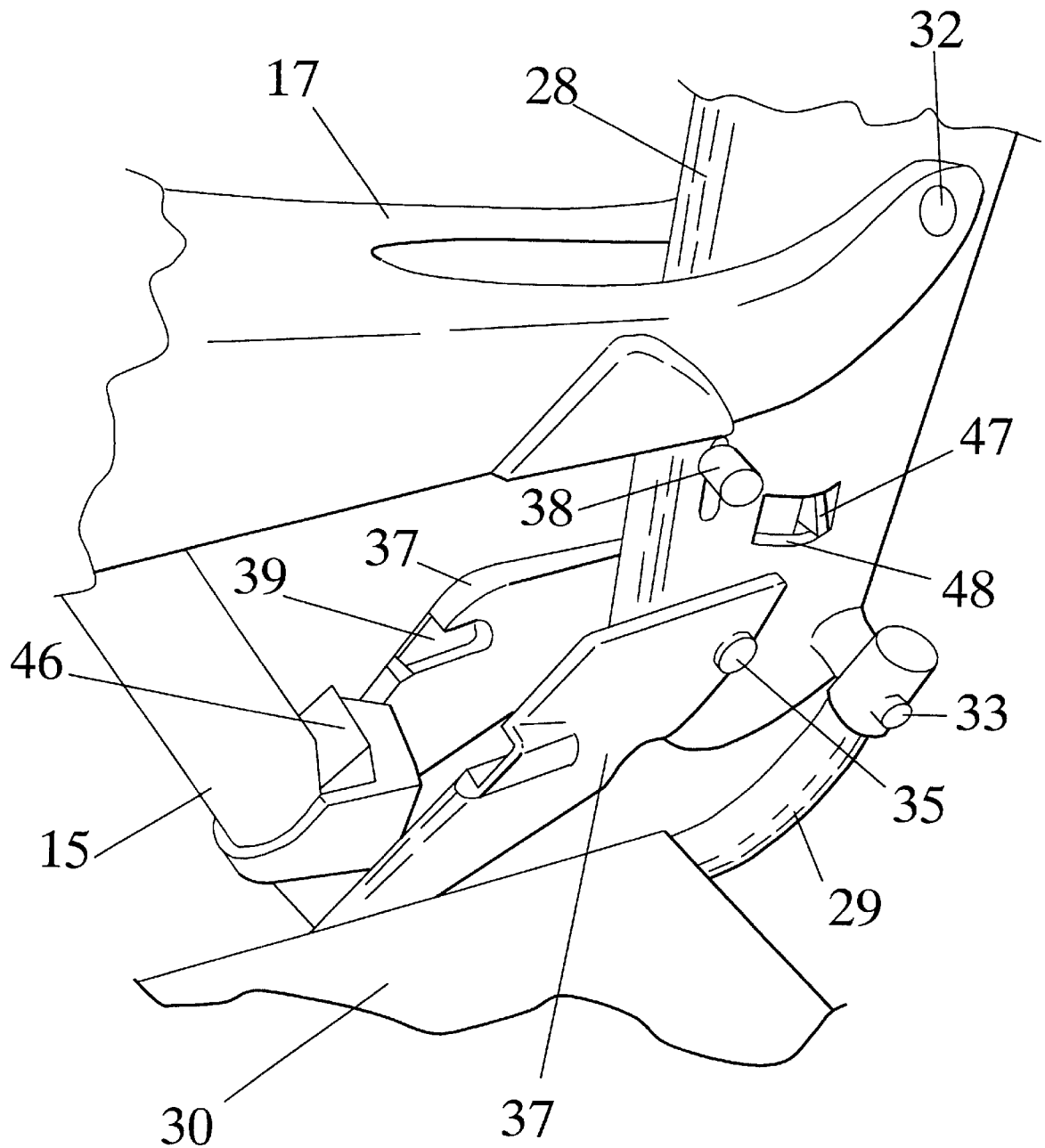
FIG. 4 shows a perspective view of a part of the stroller of FIG. 1.
Figure 5:
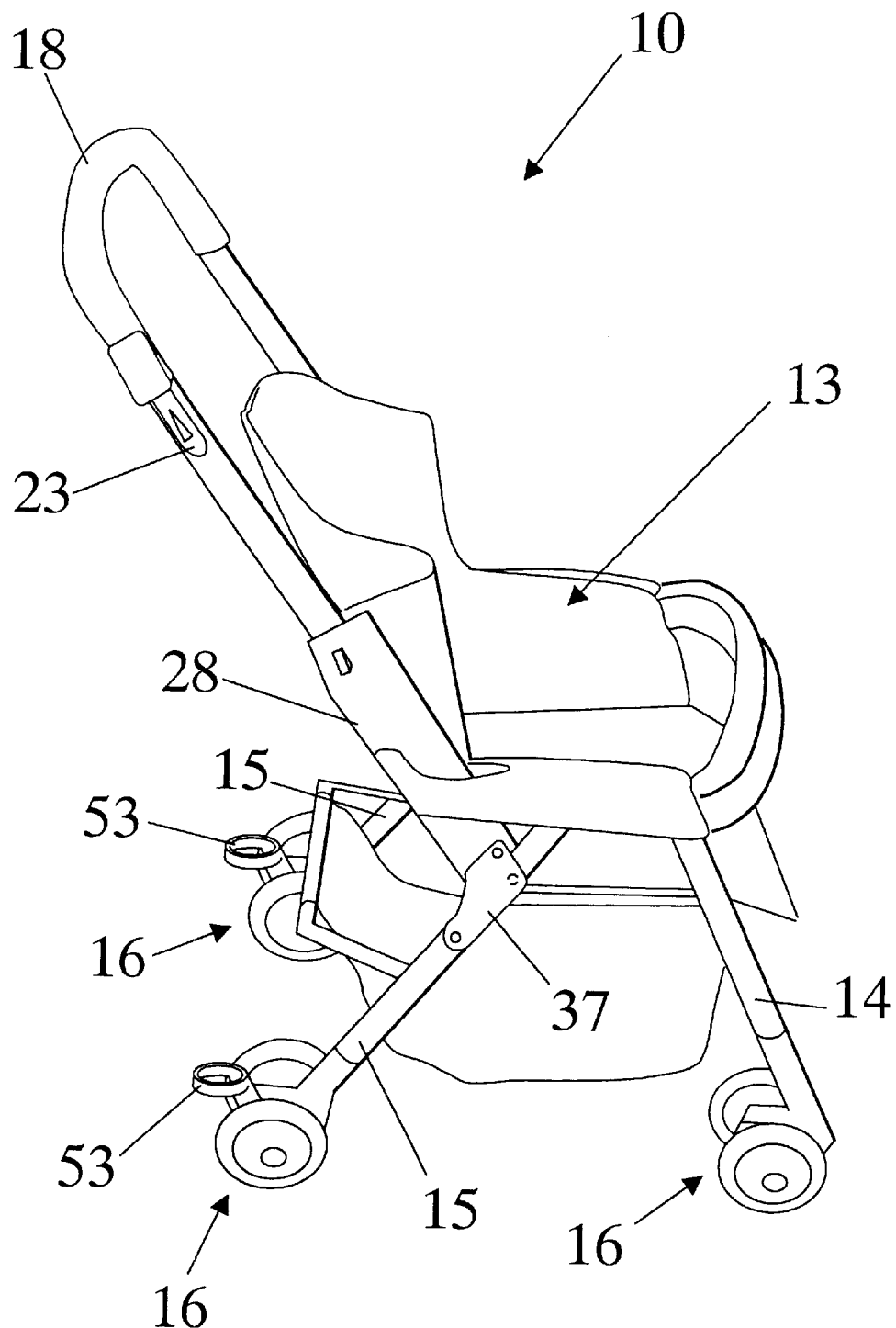
FIG. 5 shows a perspective view of the stroller of FIG. 1.

As may be seen in FIG. 3, the locking means of the stroller in folded position comprise a pawl 38 projecting laterally from the elongated member and engaging in a purposeful seat 39 in the arm of the second quadrilateral when the stroller reaches the folded position. The pawl is supported by a cursor 40 to slide against the action of a spring 41 in such a manner as to be engageable automatically and disengageable on command. For this last purpose the handlebar has on it a cam 42 which pushes against the lower end 43 of the cursor 40 to bring about disengaging sliding of the pawl upon sliding of the handlebar towards the use position.

Advantageously the additional automatic locking means 25 of the stroller in its open position comprise a sliding ferrule 44 projecting from the end of each handlebar arm and pushed by a spring 45 to engage in a receiving seat 46 made in the associated rear leg. For disengagement sliding the ferrules are connected to the above mentioned tie rods 26 inside the handlebar.

Again advantageously the handlebar 18 comprises a tooth 47 for locking in the use position and projecting laterally from at least one arm of the handlebar to engage in a corresponding hole 48 located in the wall of the member and project through the hole out of the elongated member when the handlebar is in use position (FIGS. 1 and 3). As may be seen in broken lines in FIG. 3 and solid lines in FIG. 2, upon folding of the frame the arm 37 of the second quadrilateral slides on the elongated member 28 opposite the hole 48 and pushes the locking tooth 47 towards the interior of the elongated member so as to disengage it from the hole and allow sliding of the handlebar towards the retracted position.

As another member the stroller advantageously comprises a top 49 closable as a hood. The top has bows 50 with ends 51 mutually hinged to form the hood. The elongated member forms a second seat 52 therein parallel to the handlebar arm reception housing and open at the top to receive in a sliding manner the ends of the bows when the hood is in closed position against the handlebar.

It is now clear that the predetermined purposes have been achieved by making available a stroller with minimal space occupied and easy to use.

Naturally the above description of an embodiment applying the innovative principles of the present invention is given by way of non-limiting example of said principles within the scope of the exclusive right claimed here.

What is claimed is:

1. Stroller comprising a folding tubular frame which bears a baby's seat and has pairs of front legs and pairs of rear legs bearing wheel units at the bottom thereof, as well as side armrests and a rear pushing handlebar, the folding tubular frame being collapsible in a longitudinal direction of the stroller to change from an open position to a folded position and said rear pushing handlebar being in the form of an overturned U with the arms of the U slidably engaging in corresponding seats in the collapsible frame to enable traversing of the handlebar downwards upon folding of the collapsible frame towards its folded position, so as to move said handlebar from a use position to a retracted position, wherein the stroller further comprises locking means designed to lock the collapsible frame in its folded position upon reaching said folded position and to hold this folded position steadily, said locking means designed to lock the collapsible frame in its folded position being kinematically connected to the handlebar to be automatically released upon traversing movement of the handlebar towards its use position.

2. Stroller in accordance with claim 1 wherein it comprises manually releasable automatic locking means for locking the handlebar in its retracted position.

3. Stroller in accordance with claim 1 wherein it comprises additional automatic means of locking the stroller in its open position with said additional locking means being kinematically connected to manual release means located on the handlebar.

4. Stroller in accordance with claim 1 wherein in its folded position the front and rear legs and the handlebar arms are virtually parallel.

5. Stroller in accordance with claim 1 wherein the frame describes on each side of the stroller a first jointed quadrilateral formed at the front by a front leg, at the top by an armrest, at the rear by an elongated member parallel to a handlebar arm and having therein the sliding seat of said arm, and at the bottom by a crosspiece supporting the sitting surface of the seat with there being between each elongated member and the rear leg of the same side a hinged arm forming one side of a second jointed quadrilateral whose other sides are formed by a rear leg, an armrest and the elongated sliding member of the handlebar on the same side.

6. Stroller in accordance with claim 1 wherein the rear legs comprise rings projecting rearward near wheel units and in which are fitted the ends of the handlebar arms when the stroller is in folded position.

7. Stroller in accordance with claim 5 wherein means of locking the stroller in the folded position comprises a pawl projecting laterally from the elongated member and engaging in a purposeful seat in said arm of the second quadrilateral when the stroller reaches the folded position with said pawl sliding against the action of a spring to disengage from said seat and the handlebar having on itself a cam for causing said disengagement sliding of the pawl upon sliding of the handlebar towards the use position.

8. Stroller in accordance with claim 5 wherein the additional automatic means of locking the stroller in its open position with said additional locking means being kinematically connected to manual release means located on the handlebar and that the additional automatic locking means of the stroller in its open position comprise a sliding ferrule projecting from the end of each handlebar arm to engage in a sprung manner in a housing provided in the associated rear leg with the ferrules being connected to tie rods in the handlebar and reaching manually operated pushbuttons arranged near the upper part of the handlebar to allow retraction of the ferrules from the seat by manual operation of said pushbuttons which thus form said manual release means located on the handlebar.

9. Stroller in accordance with claim 5 wherein the handlebar comprises a use position locking tooth projecting laterally from at least one handlebar arm to engage in a corresponding hole in its sliding seat in the elongated member and project through the hole out of the elongated member when the handlebar is in use position and upon folding of the frame said arm of the second quadrilateral sliding on the elongated member opposite the hole and pushing said locking tooth towards the interior of the elongated member to disengage it from the hole and allow handlebar retraction.

10. Stroller in accordance with claim 5 wherein it comprises a top closeable in the manner of a bellows and having bows with ends which are mutually hinged to form the bellows with the elongated member describing a second seat therein parallel to the housing receiving the handlebar arm and open above to receive said bow ends in a sliding manner when the bellows are in a closed position against the handlebar.

11. A stroller comprising:
   a folding frame foldable from a use position to a folded position and vice versa;
   a rear pushing handlebar in the form of an overturned letter "U" with arms forming legs of the overturned letter "U";
   seats in the frame accepting said handlebar arms in a sliding manner upon a traversing of said handlebar corresponding to a folding of said frame, said handlebar in turn moving from an extended position to a retracted position upon folding of said frame; and
   locking means self-actuating upon retraction of said handlebar and said frame reaching said folded position, to hold said frame in said folded position, said locking means being linked to said handlebar where an upward traversing of said handlebar releases said locking means allowing un-folding of said frame towards said use position.

12. A stroller in accordance with claim 11, further comprising: retraction locking means for automatically locking said handlebar in said retracted position; and
   one or more manual release means for releasing said handlebar retraction locking means to allow extension of said handlebars from said retracted position.

13. A stroller in accordance with claim 11 further comprising:
   a cam, a pawl and a locking seat, said pawl engaging said locking seat when said frame is in said folded position and said handlebar is in said retracted position, said cam forcing a disengagement of said pawl from said locking seat upon extension of said handlebar from said retracted position.

14. A stroller in accordance with claim 11, further comprising:
   a top closeable in the manner of a bellows; and
   bows with ends which are mutually hinged to form the bellows.

15. A stroller in accordance with claim 11, further comprising:
   arm rests, said arm rests at an end thereof being hingedly connected to said seats.

16. A stroller according to claim 12 further comprising:
   extension locking means for automatically locking said handlebar in said extended position corresponding to an unfolded condition of said frame in said use position; and
   remote controlled release means for releasing said extension locking means, said remote controlled release means being connected via control linkage to one or more remote actuators located on said handlebar whereupon actuation of said actuators an operation of said remote controlled release means is effected.

17. A stroller in accordance with claim 14, wherein said bow ends are hingedly mounted to said seats.

18. A stroller in accordance with claim 16 wherein, said extension locking means comprise a locking tooth projecting from at least one said handlebar arm to engage in a corresponding hole in said seat, said tooth engaging said corresponding hole when said handlebar is in said extended position.

19. A stroller in accordance with claim 16 further comprising:
   arms, front legs, a first section of said frame and a second section of said frame, together portions of which forming a quadrilateral; and
   rear legs wherein upon folding of said frame, said front legs, said rear legs and said first section of said frame fold to become substantially parallel.

20. A stroller in accordance with claim 19 further comprising:
   rings attached to said rear legs into which are fitted ends of said handlebar arms when said frame is folded.

* * * * *